(12) United States Patent
Wobben

(10) Patent No.: US 7,303,365 B2
(45) Date of Patent: Dec. 4, 2007

(54) TRANSPORT VEHICLE FOR A ROTOR BLADE OF A WIND-ENERGY TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/886,945

(22) Filed: Jul. 8, 2004

(65) Prior Publication Data

US 2005/0031431 A1    Feb. 10, 2005

Related U.S. Application Data

(63) Continuation of application No. PCT/EP02/14700, filed on Dec. 21, 2002.

(30) Foreign Application Priority Data

Jan. 8, 2002    (DE) ................ 102 00 401

(51) Int. Cl.
*B60P 7/08* (2006.01)
(52) U.S. Cl. .................. 410/45; 410/44; 280/404
(58) Field of Classification Search .......... 410/44, 410/45; 280/400, 404
See application file for complete search history.

(56) References Cited

U.S. PATENT DOCUMENTS

| 1,996,695 A | * | 4/1935 | Bigley, Jr. ............... 410/45 |
| 2,335,692 A | | 11/1943 | Murray ................. 414/346 |
| 2,725,241 A | | 11/1955 | Leonard, Jr. ............ 414/44 |
| 2,808,288 A | * | 10/1957 | Benson ................ 410/68 |
| 4,750,785 A | | 6/1988 | Helton ................. 298/8 R |
| 5,947,665 A | | 9/1999 | Baur et al. ............ 410/44 |

FOREIGN PATENT DOCUMENTS

| DE | 199 38 017 A1 | | 3/2001 | |
| JP | 48-87712 U | | 10/1973 | |
| JP | 55-1221 U | | 1/1980 | |
| JP | 55-171644 U | | 12/1980 | |
| JP | 56017778 A | * | 2/1981 | ........ 410/44 |
| JP | 61-119840 U | | 7/1986 | |
| JP | 2-113538 U | | 9/1990 | |
| JP | 6-920 U | | 1/1994 | |
| JP | 2002-59776 | | 2/2002 | |

* cited by examiner

*Primary Examiner*—Stephen Gordon
(74) *Attorney, Agent, or Firm*—Seed IP Law Group PLLC

(57) ABSTRACT

The invention is relative to a transport vehicle with a tractor and a trailer that are connected to one another during the transport of cargo by the cargo itself. The invention has the problem of making a transport vehicle available that also makes possible the transport on highways of very bulky material, especially such material that exceeds the usual profile height of underpasses and bridges (freeway bridges, etc.). A transport vehicle for a rotor blade of a wind power system with a tractor and a trailer that are connected to one another during the transport of the rotor blade by the rotor blade and that respectively comprise a holding device and/or receiving device for the rotor blade which holding device and/or receiving device is/are designed in such a manner that it/they permit(s) a rotation of the rotor blade about its longitudinal axis and that a drive for rotating the rotor blade is provided on the tractor and/or the trailer.

15 Claims, 8 Drawing Sheets

TRANSPORT VEHICLE FOR A ROTOR BLADE OF A WIND-ENERGY TURBINE

BACKGROUND OF THE INVENTION

1. Field of the Invention

The present invention relates to a transport vehicle with a tractor and a trailer that are connected to one another during the transport of cargo by the cargo itself.

2. Description of the Related Art

Such transport vehicles have long been known and are used especially in the transporting of large pipes, e.g., tower pipes of wind power systems.

The advantage of such transport vehicles, consisting of the tractor/trailer system, is substantially that the outer dimensions of the entire transport can be held to a sufficient size with a justifiable expense and in particular the transport height can be held so low that it is regularly possible to travel through underpasses, tunnels, bridges and the like.

DE 199 38 017 teaches a device for receiving oversize loads. This device is a low-bed trailer on which the oversize load can be pivoted, if necessary and desired, from a horizontal position into an almost vertical position.

However, in the field of wind power technology even previously known transport vehicle systems are reaching their limits because the outer dimension of the structural units such as, e.g., tower segments, rotor blades, etc. have become so great that the use of such transport systems is no longer readily possible. The suggestion has already been made that newly designed zeppelin vehicles be used for transporting large and bulky loads; however, the transport with such systems has not yet been tested and, moreover, very high transport costs must be reckoned with in the case of such systems.

BRIEF SUMMARY OF THE INVENTION

The present invention provides a method and a transport vehicle aimed at the problem of making a transport vehicle available that makes possible the transport on highways of very bulky material, especially such material that exceeds the usual profile height of underpasses and bridges (freeway bridges, etc.).

This problem is solved with a transport vehicle with the means with the features according to claim 1. Advantageous further developments are described in the dependent claims.

The transport vehicle in accordance with the invention is especially suited for transporting large rotor blades with a length greater than 40 m and a maximum width of more than 5 m.

This great transport width signifies in the normal instance that even the normal roadway profile is exceeded as regards the width of a freeway lane with such a transport. The large width of a rotor blade exceeds the width of a freeway lane. The rotor blade should therefore also be transported in a "vertical" position so that the maximum width of the rotor blade therefore represents the maximum height of the entire transport. However, if such a transport must pass through a freeway bridge it can occur that the transport height is too great and passage under a freeway bridge (the height is usually 4 m or 5 m) is impossible.

If the entire rotor blade is rotated prior to passing under the freeway bridge, it is placed on its "side" in such a manner that the rotor blade is no longer vertical at its maximum width location, but rather it is placed approximately 90° to the side so that it is now possible to travel under a freeway bridge. After the passage through the freeway bridge the rotor blade can be rotated back into its previous position by means of the rotating device so that the traffic on other freeway lanes is no longer hindered, which is very likely during the passage through the freeway bridge.

DETAILED DESCRIPTION OF THE INVENTION

The present detailed description is directed toward wind power system rotor blade transportation means. Several details of certain embodiments of the invention are set forth in the following description and illustrated in FIGS. 1-8. One skilled in the art, however, will understand that the present invention may have additional embodiments and may be practiced without several of the details described in the following description and illustrated in the figures.

Figure 1:
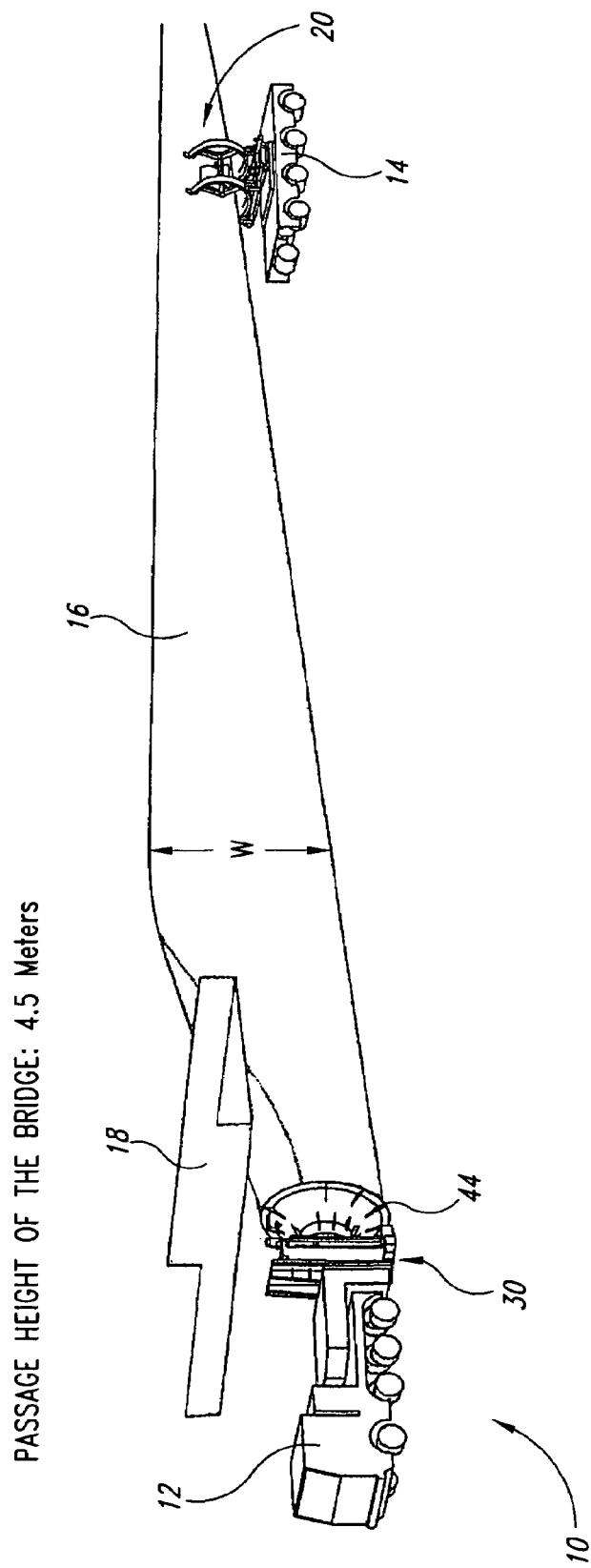
FIG. 1 is an isometric view of a transport vehicle holding a rotor blade in the vertical position according to one embodiment of the present invention.

FIG. 1 illustrates a rotor blade 16 being transported by means of a transport vehicle 10 according to one embodiment of the present invention such that the rotor blade maximum width (W) (which is, for example, 5 m or more) is positioned vertically. The transport vehicle 10 is comprised of a tractor 12. a rotor blade 16, and a trailer 14. The tractor 12 has a rotor blade holding device 30, and the trailer 14 includes a trailer rotor blade holding device 20.

Figure 2:
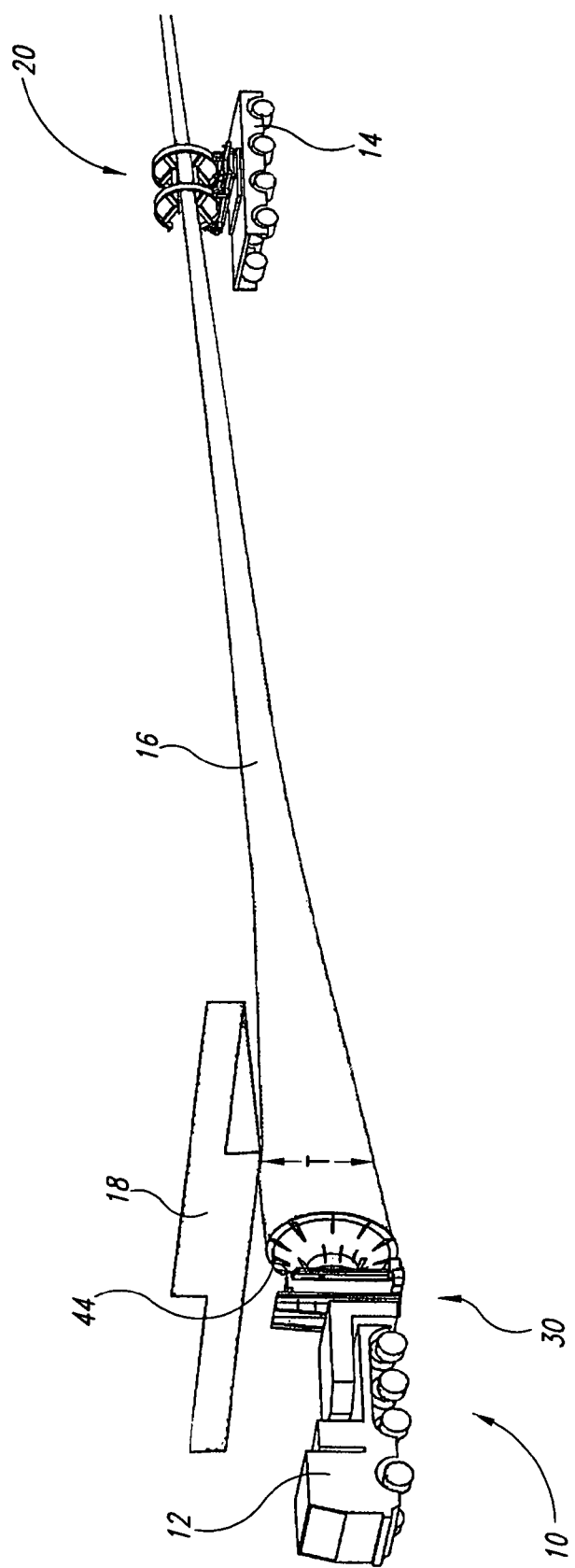
FIG. 2 is an isometric view of the transport vehicle of FIG. 1 holding the rotor blade in a rotated horizontal position.

FIG. 2 illustrates the transport vehicle 10 of FIG. 1 with the rotor blade 16 being transported in a rotated horizontal position such that the rotor blade thickness (T) is positioned vertically and the rotor blade maximum width (W) is now positioned horizontally. When a freeway bridge 18 or other obstacles with a vertical height limitation are encountered, the entire rotor blade 16 is selectively rotated by approximately 90°, as illustrated in FIG. 2, so that it is possible to pass under the freeway bridge 18 or other height-limited obstacle without contact.

In another embodiment of the present invention it is also readily possible for the roadway passage profile of roads to be measured and appropriately programmed or stored in a databank in such a manner that if the cargo height during transport is too great for passing under a height-limited obstacle, an appropriate pivoting into a horizontal or side position is automatically initiated or is displayed to the vehicle driver so that he can initiate rotation of the cargo.

Figure 3:
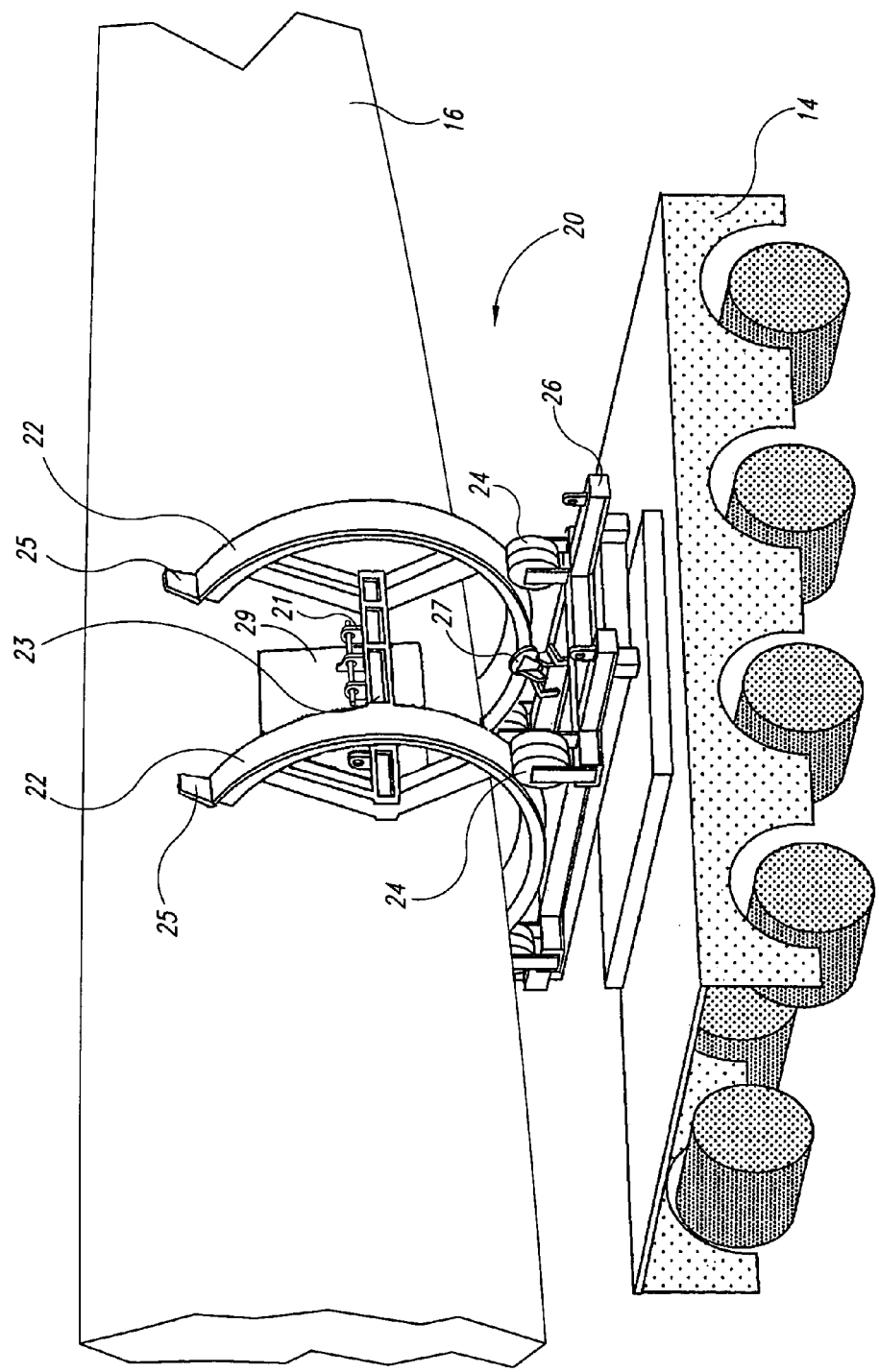
FIG. 3 is an isometric view of a holding device rotatably mounted on the trailer of the transport vehicle of FIG. 1 holding the rotor blade in the vertical position.

FIG. 3 illustrates, according to one embodiment of the present invention, the position of the trailer rotor blade holding device 20 before the rotation of the rotor blade. In this embodiment of the present invention, one or more radial frames 22 support the rotor blade holding frame 23. Furthermore, the radial frames 22 rest on plurality of rollers 24 to allow the rotation of the rotor blade 16. The plurality of rollers 24 are mounted on a trailer attach frame 26. Those skilled in the art will appreciate other embodiments of the present invention that allow for the rotation of the rotor blade 16 at the trailing end. For example, the rollers 24 may be mounted on the radial frames 22 and roll inside a radial track with a radius that corresponds to the rotation of the rotor blade 16.

Figure 4:
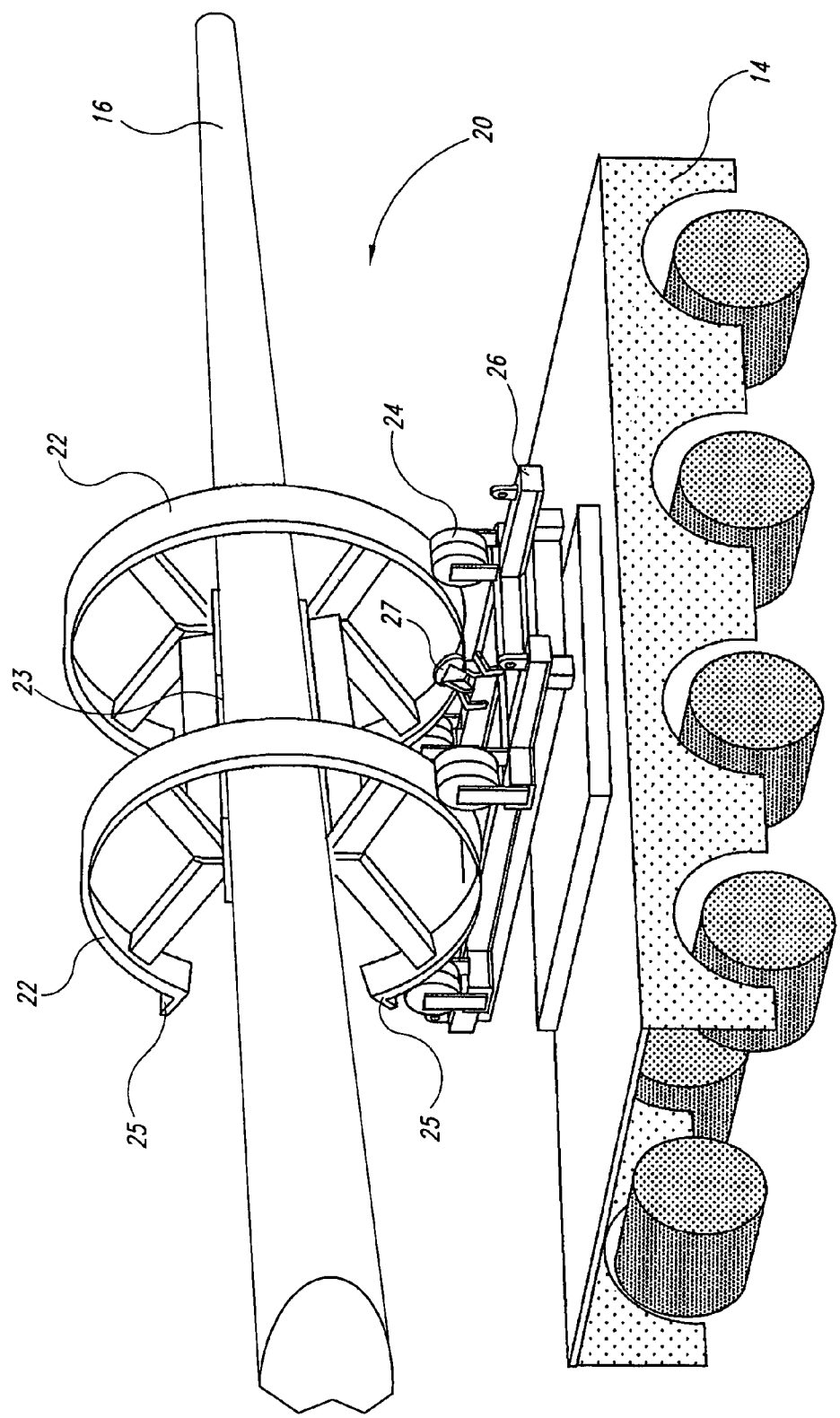
FIG. 4 is an isometric view of the holding device of FIG. 3 holding the rotor blade in a rotated horizontal position.

FIG. 4 illustrates the position of the trailer rotor blade holding device 20 and the rotor blade 16 after the rotation. The flanges 25 are incorporated at the ends of radial frames 22 to prevent over-rotation of the rotor blade 16 at the trailing end. Moreover, the rollers 24 are mounted on the trailer attach frame 26. Also shown in FIG. 4 are Guide rollers 27, which maintain the radial motion of the radial frames 22 about the rotor blade 16 rotational axis.

Figure 5:
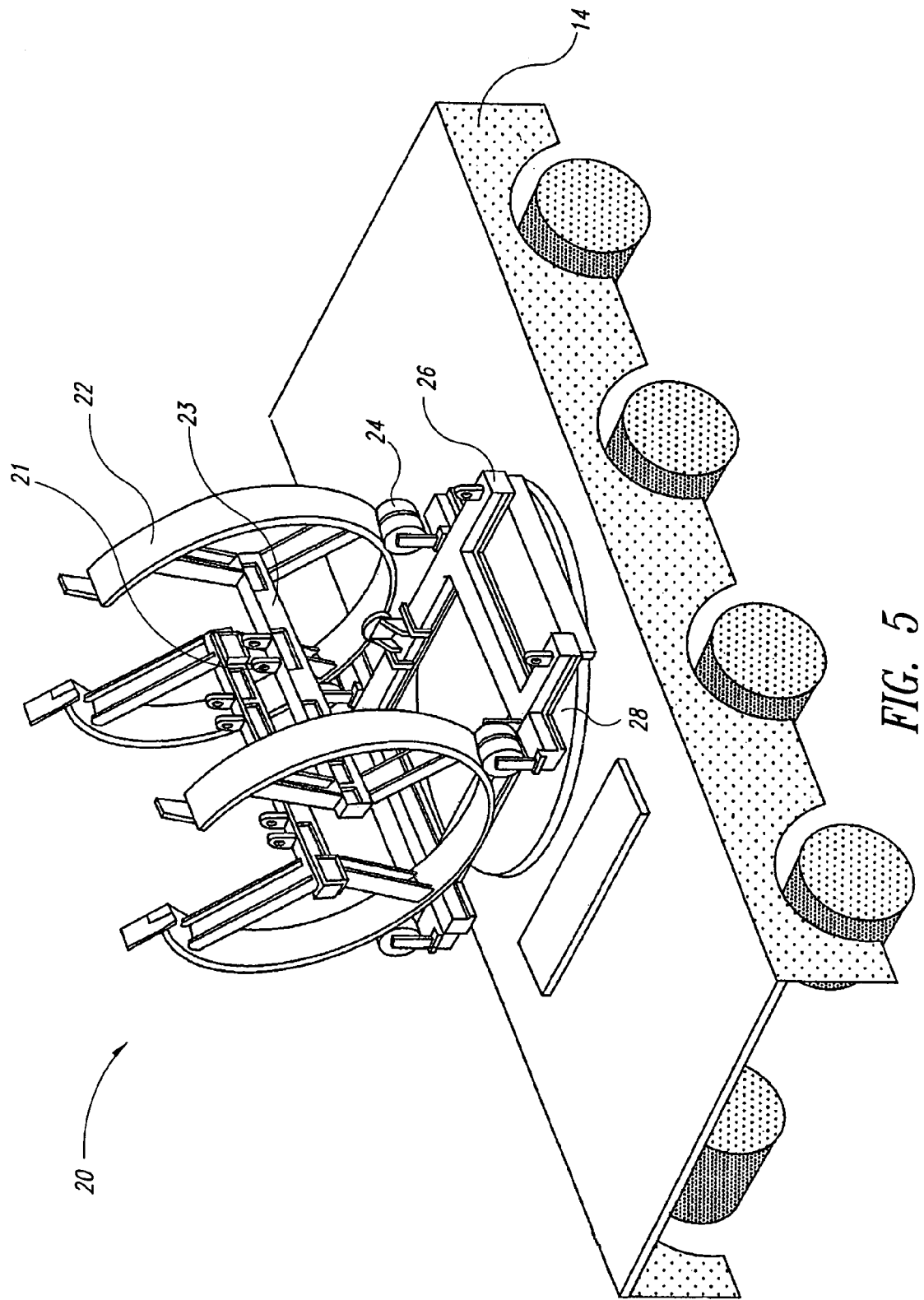
FIG. 5 is an isometric view of an alternative embodiment of the holding device of FIG. 3 with the rotor blade not present.

FIG. 5 illustrates another embodiment of the trailer rotor blade holding device 20 with the rotor blade 16 not present. In this embodiment of the present invention, the trailer attach frame 26 of the trailer rotor blade holding device 20 is mounted on a rotatable frame mount 28, which is rotatably mounted on the trailer 14 to allow for easier maneuvering through curves and turns.

Figure 6:
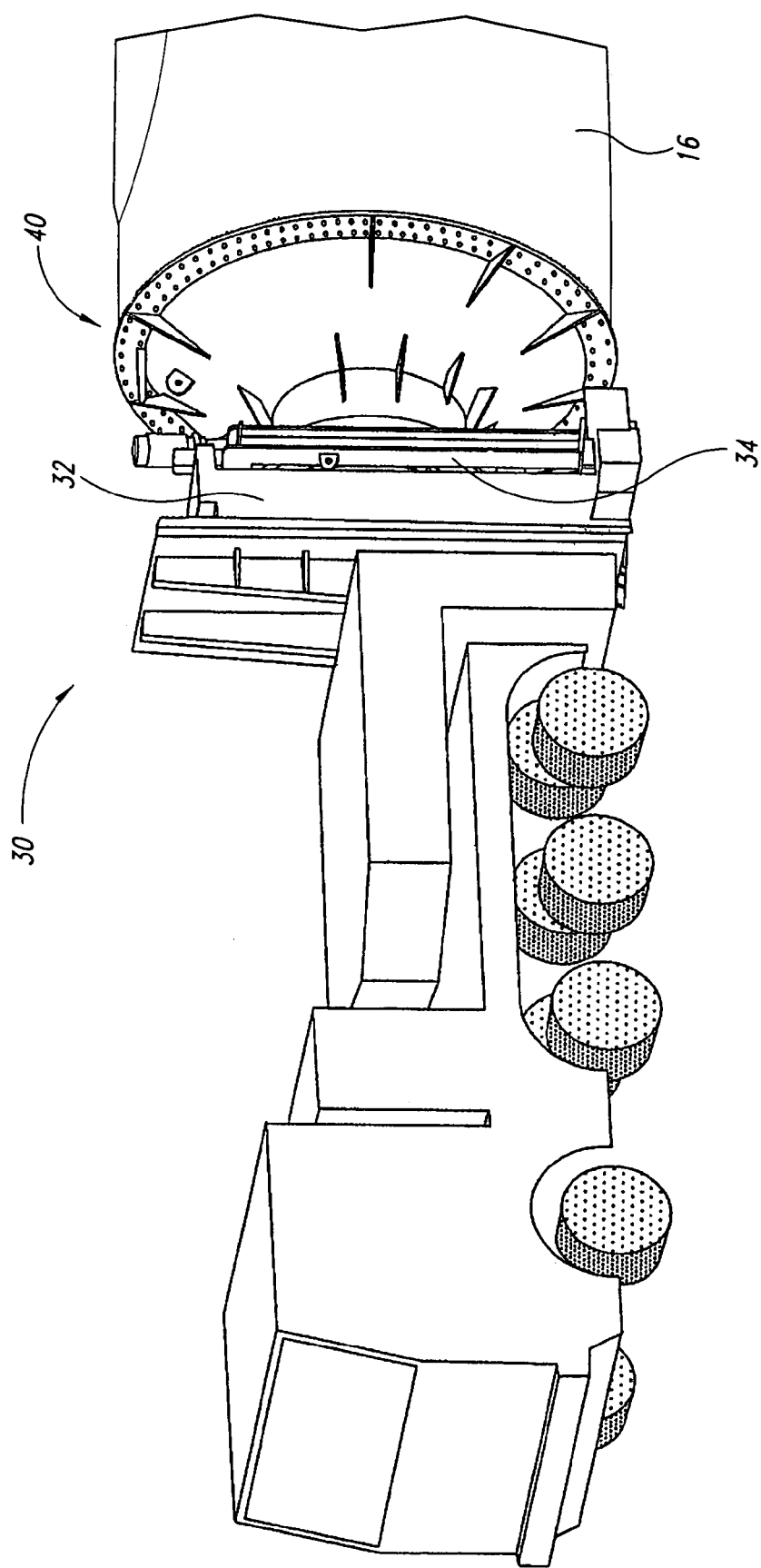
FIG. 6 is an isometric view of a holding device operably connected to the tractor of the transport vehicle of FIG. 1 and receiving the rotor blade at the rotor blade root.

FIG. 6 illustrates, according to one embodiment of the present invention, a view of the tractor 12 of the transport device 10 with a holding device 30 for receiving the rotor blade 16 at the rotor blade root 40. In this embodiment of the present invention, the tractor rotor blade holding device 30 comprises a tractor attach frame 32 and a cradle 34. The cradle 34 is fixedly coupled to the tractor attach frame 32 and receives the rotor blade root 40.

Figure 7:
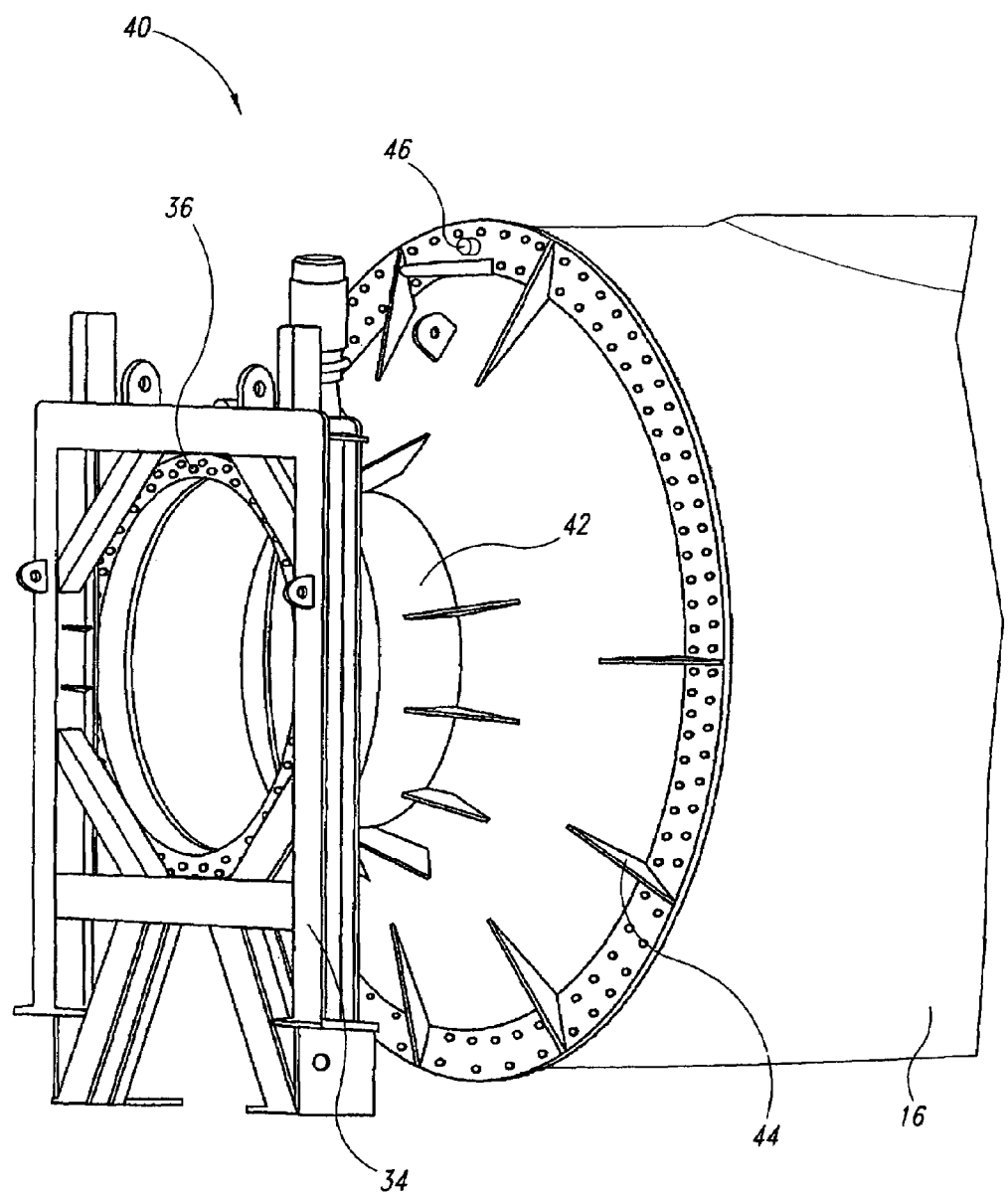
FIG. 7 is an isometric view of the frame of the holding device of FIG. 6 captively receiving a rotary support that is rotatably connected to the rotor blade root.

FIG. 7 illustrates in more detail the reception of the rotor blade root 40 by the cradle 34. In this embodiment of the present invention, since the diameter of the rotor blade 16 is very large (more than 2 m), an intermediate device 42 is positioned between the cradle 34 and the rotor blade 16. The intermediate device 42 is rotatably coupled to buff joint ring 36, which is captively received by the cradle 34. The intermediate device 42 is fixedly coupled to the rotor blade 16 such that when rotated, the intermediate device 42 prompts the rotation of the rotor blade 16. In addition, a plurality of stiffening members 44 may be incorporated on the transition regions between the rotor blade 16 and the intermediate device 42 to prevent structural deformation of the rotor blade root 40.

Figure 8:
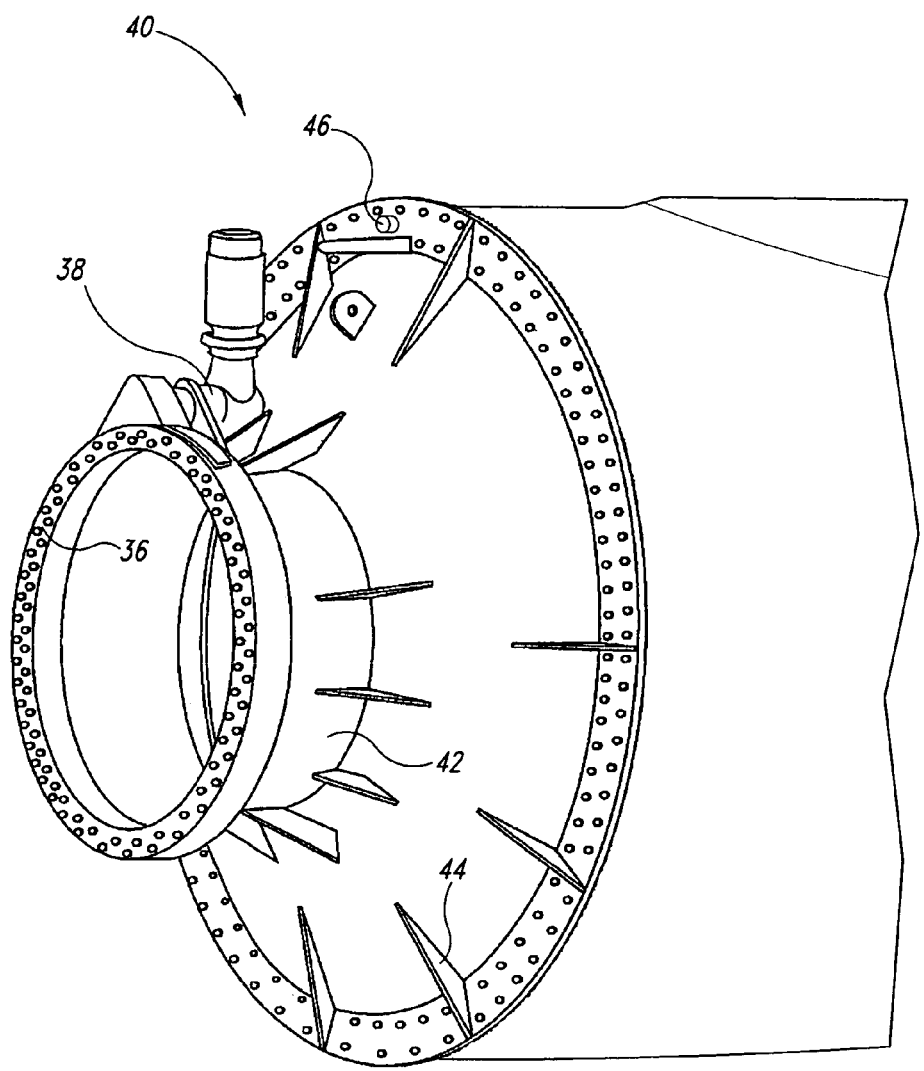
FIG. 8 is an isometric view of the rotary support and the rotor blade root of FIG. 7 with the frame of the holding device of FIG. 6 not present and showing the rotary drive.

FIG. 8 illustrates the rotor blade root of FIG. 7 with the cradle 34 not present. The rotation of the intermediate device 42 is selectively prompted by the rotary drive 38. Upon approaching a freeway bridge 18, as shown in FIGS. 1 and 2, or other obstacles with a height limitation, the transport vehicle operator may actuate the rotary drive 38 via remote control means inside the tractor cabin to initiate the rotation of the intermediate device 42, which in turn rotates the rotor blade 16. Alternatively when the roadway passage profile of roads are measured and appropriately programmed or stored in a databank, the rotary drive 38 may be prompted automatically upon approaching obstacles with height limitation. These figures also show that the intermediate piece comprises a rotary drive and an appropriate rotary support.

The intermediate piece is fastened to a holding frame of the tractor on the side facing away from the rotor blade.

The trailer rotor blade holding device 20 located on the trailer is rotatably mounted and follows the rotation of the rotor blade by means of the rotary drive on the intermediate device 42 that rotates the rotor blade 16. Alternatively, the trailer rotor blade holding device 20 may also comprise a controlled rotary drive that is coordinated in such a manner as to correspond with the rotary drive 38 that rotates the intermediate device 42.

In one alternative embodiment the butt joint ring 36 is the ring that will bolt the blade 16 to the wind power device. It is rigidly fixed to the cradle 34. The drive motor 38 and gearing are the same that will be used to feather the blade while in operation on the wind power device. Thus, the same structure that will be used to connect and turn the blade on the final wind power installation will be used to connect and rotate the blade while being transported.

The trailer rotor blade holding device 20, as shown according to one embodiment of the invention in FIGS. 3 through 5, may be adapted to the particular profile of the rotor blade at the rotor blade holding frame 23. The rotor blade may comprise one or more passages 29 that provide for means to lock the blade in place. For example, in one embodiment as shown in FIG. 3, the passage 29 may comprise a lug that mates with the rotor blade holding frame lugs 21, through which appropriate holding bolts may extend so that the rotor blade cannot slip off the holding device of the trailer under any circumstances. Those skilled in the art will appreciate alternate means for securing the rotor blade to the rotor blade holding frame 23 on the trailer rotor blade holding device 20 without deviating from the scope and spirit of the present invention.

As can be further recognized, the holding device provided on the trailer is itself rotatably mounted in order to make it easier to drive through curves.

In addition, the transport vehicle 10 of the present invention may include, in one embodiment of the invention as illustrated in FIG. 7, one or more warning devices 46. Warning devices 46 can sense a potential collision of the transported cargo with a passable limitation (to the side, above or below) and report this to the driver cabin in the instance of such a danger of collision so that the transporting driver can effect a timely pivoting of the cargo such that a collision of the cargo with a profile limitation of the roadway is no longer possible.

The rotating of the cargo can take place when the vehicle is standing or also during a slow or moderate travel of the vehicle.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A transport vehicle for a rotor blade of a wind power system with a tractor and a trailer that are connected to one another by the rotor blade during transport of the rotor blade and that respectively comprise:

at least one of a holding device and a receiving device for the rotor blade, the at least one of the holding device and the receiving device being designed in such a manner that permits a rotation of the rotor blade about the rotor blade's longitudinal axis and wherein a drive to rotate the rotor blade is provided on at least one of the tractor and the trailer.

2. The transport vehicle according to claim 1, wherein the at least one of the holding device and the receiving device is associated with the tractor and receives an intermediate piece located between the rotor blade and the at least one of the holding device and the receiving device.

3. The transport vehicle according to claim 1 wherein the at least one of the holding device and the receiving device is associated with the trailer and includes a rotatable holding fixture.

4. The transport vehicle according to claim 1 wherein the at least one of the holding device and the receiving device is associated with the trailer and includes a rotor blade locking device coupled to the rotor blade.

5. The transport vehicle according to claim 1 wherein said trailer further comprises:
- a trailer bed mounted on plurality of wheels;
- a trailer attach frame rotatably mounted on the trailer bed;
- one or more radial frames rotatably mounted on the trailer attach frame; and
- a cargo holding frame fixedly coupled to said one or more radial frames to captively receive an outboard end of the rotor blade of the wind power system.

6. The transport vehicle according to claim 1,
- wherein said trailer includes a traction means for propelling the transport vehicle and for supporting a first end of the rotor blade;
- wherein said trailer includes a supporting means for supporting a second end of the rotor blade, the traction means and the supporting means being coupled to each other by the rotor blade during the transport of the rotor blade;
- wherein said holding device includes a holding means coupled to the traction means for holding the rotor blade;
- wherein said receiving device includes a receiving means for receiving the rotor blade coupled to the supporting means and for permitting rotation of the rotor blade about the rotor blade's longitudinal axis; and
- wherein said drive includes a driving means coupled to the rotor blade for rotating the rotor blade.

7. The transport vehicle according to claim 6, further comprising:
- an intermediate connecting means coupled to the rotor blade and to the holding means for connecting the rotor blade to the traction means.

8. The transport vehicle according to claim 7, wherein the intermediate connecting means is provided with the driving means for rotating the rotor blade.

9. The transport vehicle according to claim 6, wherein the holding means and the receiving means are associated with the supporting means and include a fixture means for at least partially enclosing the rotor blade, the fixture means being rotatably mounted for allowing a rotation around the rotor blade's longitudinal axis.

10. The transport vehicle according to claim 9, wherein the fixture means comprises at least one rotor blade holding frame adapted to a profile of the rotor blade, the rotor blade holding frame being mounted on at least one radial frame resting on a plurality of rollers.

11. The transport vehicle according to claim 6, wherein at least one of the holding means and the receiving means is associated with the supporting means and includes a locking means for locking the rotor blade, which locking means is coupled to the rotor blade.

12. The transport vehicle according to claim 11, wherein the locking means comprises at least one holding bolt extending through the rotor blade for preventing a displacement of the rotor blade along the longitudinal axis of the rotor blade.

13. The transport vehicle according to claim 11, wherein the rotor blade is provided with at least one rotor blade lug and the locking means further comprises at least one holding frame lug to mate with the rotor blade lug to prevent a displacement of the rotor blade along the longitudinal axis of the rotor blade.

14. The transport vehicle according to claim 6, wherein at least one of the holding means and the receiving means is associated with the supporting means and is rotatably coupled to the supporting means for allowing a rotation thereof around a vertical axis.

15. The transport vehicle according to claim 1, further comprising at least one warning means for sensing a potential collision of the rotor blade and for reporting an appropriate warning of the collision.

* * * * *